United States Patent [19]

Darr

[11] Patent Number: 5,405,905
[45] Date of Patent: Apr. 11, 1995

[54] ARTIFICIAL SOIL AND SOIL-FORMING COMPOSITION

[75] Inventor: Lanny Darr, Chatsworth, Calif.

[73] Assignee: Hy-Tec Enterprises, Lancaster, Calif.

[21] Appl. No.: 157,246

[22] Filed: Nov. 26, 1993

[51] Int. Cl.$^6$ .......................... C08K 3/30; C08K 3/22; C08L 33/26
[52] U.S. Cl. ................................. 524/420; 524/432; 524/555
[58] Field of Search ................ 524/420, 432, 555, 474

[56] References Cited

U.S. PATENT DOCUMENTS

| | | | |
|---|---|---|---|
| 3,822,214 | 7/1974 | Juby | 524/420 |
| 4,165,418 | 8/1979 | Speakman | 524/555 |
| 4,985,061 | 1/1991 | Hughes | 526/240 |
| 5,336,708 | 8/1994 | Chen | 524/474 |

FOREIGN PATENT DOCUMENTS 0157161 12/1975 Japan ................................. 524/555

*Primary Examiner*—Peter A. Szekely
*Attorney, Agent, or Firm*—John J. Posta, Jr.

[57] ABSTRACT

The artificial plant soil composition is a major proportion, by weight, of a hydrated, non-toxic polymeric gel, such as one formed of a polyacrylamide co-polymer and water, and a minor proportion, by weight, of a non-toxic phosphorescent pigment uniformly distributed in the gel. The pigment preferably is about 98.5 percent, by weight of the pigment, of zinc sulfide, with substantially the remainder being zinc oxide, but with sufficient copper sulfide present, for example, about 500 ppm, to activate the zinc sulfide. The polyacrylamide co-polymer is usually about 1 percent, by weight, of the composition, with the water forming the remainder, except for the pigment. The pigment is usually present in a concentration of about 0.12 percent, by weight of the composition. The composition is used as a potting soil for plants and has the added effect of attractively exhibiting phosphorescence. The presence of the pigment in the gel does not cloud the clear gel.

9 Claims, No Drawings

ARTIFICIAL SOIL AND SOIL-FORMING COMPOSITION

FIELD OF THE INVENTION

The present invention generally relates to horticultural aids and more particularly to a decorative phosphorescent artificial plant soil and soil-forming composition.

PRIOR ART

Various types of artificial soils and soil supplements have been provided in the past. Certain of such compositions employ synthetic materials which readily hydrate and slowly release water back to the plants disposed therein. They are therefore used as a means of conserving water. When they are added to conventional potting soil, they help to cut down on the amount of water needed to maintain the plants planted in the thus treated soil.

In some instances, artificial soils have been used to totally replace natural soils for growing plants. One advantage with such artificial soils is that they are usually less messy than natural soils. They can act as a medium for the necessary nutrients needed by the plants for vigorous growth. In some instances soils have been totally dispensed with and water bearing dissolved nutrients have been substituted, forming the separate science of hydroponics. While hydroponics has its special advantages and uses, for most purposes non-liquid plant growing media are most desirable. There remains a need for new improved types of artificial soils.

For example, it would be desirable to be able to provide an improved artificial soil having novel visual characteristics. Such a soil with an attractive decorative appearance would find ready acceptance with the home indoor plant grower. Thus, an attractively colored artificial soil could enhance the overall decorative impact of a plant disposed therein. However, care would have to be taken to provide the desired enhanced visual effect without impairing the utility of the artificial soil as a plant-growing medium. In addition, the artificial soil should be useful in conserving water and should be inexpensive to purchase and use. It should have durability and serve as an efficient medium for plant nutrients.

SUMMARY OF THE INVENTION

The improved artificial soil composition of the present invention satisfies all the foregoing needs. Thus, the composition is substantially set forth in the Abstract of the Disclosure.

The composition comes in two types: a soil-forming, solid, dry, particulate, non-toxic composition; and, a comparable gel composition which comprises the soil-forming composition after hydration with a large amount of water.

The soil-forming composition comprises a major proportion of a readily hydratable non-toxic polymeric material. The material of choice is polyacrylamide copolymer which is readily commercially available and which readily hydrates, setting to a clear gel when mixed with large quantities of water. In this regard, as little as 0.5 percent, by weight, or less of the gel can comprise the polyacrylamide copolymer, with the remainder comprising the water. Thus, the copolymer binds large quantities of water which is slowly released from the gel for maximum plant watering effectiveness and maximum water conservation.

A minor proportion of the soil-forming composition comprises the phosphorescent pigment. The pigment is non-toxic to plants and humans and preferably consists essentially of zinc sulfide with minor concentrations of zinc oxide and copper sulfide. Thus, for example, the pigment may comprise about 98.5 percent of zinc sulfide, by weight of the pigment, while essentially the remainder is zinc oxide, the copper sulfide being present in a concentration just sufficient to help activate the zinc sulfide. Such a concentration may be, for example, about 500 ppm. Preferably, the pigment is present in up to about 6 percent by weight of the soil-forming composition, with the copolymer forming the remainder of the composition. It will be understood that, if desired, mineral nutrients and the like can also be present in the soil-forming composition.

Various other features of the improved soil-forming composition of the present invention and of the artificial soil formed using such composition are set forth in the following detailed description.

DETAILED DESCRIPTION

Now referring more particularly to the artificial soil-forming composition of the present invention, such composition is a dry solid particulate material, preferably in granular form, and has the following ingredients:
 a) a readily water-hydratable, non-toxic, polymeric gel-forming material in a major proportion, by weight; and,
 b) a minor proportion, by weight, of a non-toxic phosphorescent pigment.

The polymeric material preferably is a conventional, readily commercially available copolymer of polyacrylamide. Polyacrylamide is a white, water-soluble high polymer used as a thickening agent in many formulations. While other polymeric, readily hydratable, gel-forming substances are usable in the formulation, synthetic, high molecular weight cross-linked polyacrylamide copolymer is the material of choice. It is commercially available and is inexpensive. Preferably, this component of the soil-forming composition is present in a concentration, by weight, in the soil-forming composition of at least about 94 percent.

The phosphorescent pigment is present in the soil-forming composition in an amount sufficient to impart phosphorescence thereto and preferably is zinc sulfide with minor proportions of zinc oxide and copper sulfide. A most preferred pigment is one in which the zinc sulfide is present in a concentration, by weight of the pigment, of about 98.5 percent, with the zinc oxide present in about 1.5 percent and the copper sulfide present in a minute, zinc sulfide-activating amount of, for example, about 500 ppm. Other relative proportions of the phosphorescent pigment ingredients are possible. The pigment is readily commercially available. It provides the desired greenish phosphorescence when the soil-forming composition is mixed with water and hydrated to the desired gel which serves as the artificial soil. The concentration of the pigment in the soil-forming composition is preferably about 4–6 weight percent, although other concentrations can be used.

Water-soluble, dry nutrients which do not interfere with the appearance of the desired clear gel obtained upon hydrating the soil-forming composition may also be present, if desired, as may one or more conventional emulsifiers, etc.

The artificial soil composition of the present invention formed by hydrating the soil-forming composition of the present invention has the following composition:
a) about 0.5–2.0 percent by weight of the soil-forming composition described above; and,
b) substantially the remainder comprising water.

The artificial soil composition is formed by thoroughly mixing the granular (preferably powdered) soil-forming composition with the water and allowing the hydration to take place, usually over a 3–6 hour period. The result is a clear gel which is phosphorescent and colored a greenish hue.

Phosphorescence is fluorescence that continues for more than a short time (1–6 seconds, e.g.) after radiation, which excites it to glow, has ceased. Phosphorescent materials are those which absorb ultraviolet light and emit visible light. Materials other than the pigment set forth above can be used as the phosphorescent pigment in the described compositions in addition to or in place thereof. For example, phosphorescent paints made by heating sodium carbonate, sodium chloride and manganius sulfate with strontium carbonate and sulfur in the absence of air can be used. Phosphorescent material can also be made using barium thiosulfate. Various other phosphorescent pigments well known in the art can be used, providing they are non-toxic for plants and humans in the concentrations utilizable in the present compositions.

Further features of the present invention are set forth in the following Specific Examples:

| INGREDIENTS | PERCENTAGE BY WEIGHT |
| --- | --- |
| a) polyacrylamide copolymer | 94 |
| b) phosphorescent pigment A: | 6 |
| 98.5% zinc sulfide | |
| 1.5% zinc oxide | |
| 500 ppm copper sulfide) | |

The above composition A is mixed with water which contains essentially no sodium ions i.e. has been purified, in the following ratio:

| INGREDIENTS | PERCENTAGE BY WEIGHT |
| --- | --- |
| a) water | 99 |
| b) composition A | 1 |

The resulting composition is allowed to stand for five hours, at the end of which time it has formed into a plastic, clear gel which has a greenish hue and is phosphorescent, glowing when struck by ultraviolet light. The result is an artificial potting soil which has a remarkably attractive appearance and which releases water slowly to plants disposed therein. The resulting decorative effect of the soil is very unusual and appealing.

EXAMPLE II

The same procedure as set forth in Example I is followed in all respects, except the formulation of Composition A is changed by increasing the concentration of the copolymer to 96 weight percent and decreasing the pigment concentration to 4 weight percent. Moreover, the concentration of composition A in the water in the artificial soil is decreased to about 1.50% by weight. Comparable results are obtained with those obtained in Example I. In all instances purified water which has been distilled or otherwise stripped of sodium ions is used to prevent degradation of the water-holding ability of the polyacrylamide copolymer.

When further parallel tests are run using synthetic, polymeric, readily hydratable, gel-forming materials in place of the described copolymer and utilizing other phosphorescent, non-toxic pigments in place of the zinc sulfide pigment described above, comparable results are obtained. In all instances, superior, artificial plant-growing soils which have improved visual appearance are obtained.

Moreover, as in the soil compositions of Examples I and II, the colored phosphorescent appearance of the soils aids the visual measuring of the soils into plant pots and other vessels and aids checking the levels thereof during shrinkage of the gels. Substantial shrinkage of the gels is a useful signal for the introduction of water to the soils, in contrast to conventional soils where the moisture in the soils must be determined by instruments or, crudely, by touch.

Various other modifications, alterations, changes and additions can be made in the improved soil-forming composition of the present invention and in the improved artificial soil composition of the present invention. All such modifications, changes, alterations and additions as are within the scope of the appended claims form part of the present invention.

What is claimed is:

1. An improved artificial plant soil composition, said composition consisting essentially of:
    a) a major concentration, by weight, of a hydrated, non-toxic polymeric gel;
    b) a minor concentration, by weight, of a phosphorescent, non-toxic pigment uniformly distributed in said gel, whereby said composition is phosphorescent; and
    c) wherein said polymeric gel comprises a major concentration, by weight, of water and a minor concentration, by weight, of a co-polymer of polyacrylamide.

2. The improved composition of claim 2 wherein said phosphorescent pigment comprises zinc sulfide.

3. The improved composition of claim 2 wherein said phosphorescent pigment includes zinc oxide and sufficient copper sulfide to activate said zinc sulfide.

4. The improved composition of claim 3 wherein said phosphorescent pigment comprises, by weight of said pigment, about 98.5 percent of zinc sulfide, about 1.5 percent of zinc oxide and about 500 parts per million of copper sulfide.

5. The improved composition of claim 1 wherein said polyacrylamide co-polymer comprises at least about 1 percent, by weight, of said composition.

6. The improved composition of claim 5 wherein said polyacrylamide co-polymer comprises at least about 94 percent, by weight, of the total of said polyacrylamide co-polymer and said phosphorescent pigment in said composition.

7. The improved composition of claim 6 wherein said composition consists essentially by weight of about 1 percent of polyacrylamide co-polymer, about 0.12 percent of zinc sulfide, about 0.0018 percent of zinc oxide and about 30 parts per million of copper sulfide, the remainder of said composition comprising water.

8. An improved, dry, granular artificial plant soil-forming composition, said composition comprising, in combination:

a) a major proportion, by weight, of granules of a gel-forming, water-hydratable, non-toxic polymeric material;

b) a minor proportion, by weight, of a granular non-toxic phosphorescent pigment; and c) wherein said polymeric material comprises a polyacrylamide co-polymer.

9. The improved composition of claim 8 wherein said phosphorescent pigment comprises, by weight of said pigment, about 98.5 percent zinc sulfide, about 1.5 percent zinc oxide and about 500 parts per million of said copper sulfide.

* * * * *